(12) United States Patent
Coleman

(10) Patent No.: US 7,914,192 B2
(45) Date of Patent: Mar. 29, 2011

(54) ENHANCED LIGHT DIFFUSING SHEET

(75) Inventor: Zane Coleman, Somerville, MA (US)

(73) Assignee: Fusion Optix, Inc., Woburn, MA (US)

( * ) Notice: Subject to any disclaimer, the term of this patent is extended or adjusted under 35 U.S.C. 154(b) by 1057 days.

(21) Appl. No.: 11/679,628

(22) Filed: Feb. 27, 2007

(65) Prior Publication Data

US 2007/0201246 A1 Aug. 30, 2007

Related U.S. Application Data

(63) Continuation-in-part of application No. PCT/US2005/031276, filed on Aug. 31, 2005.

(60) Provisional application No. 60/605,956, filed on Aug. 31, 2004.

(51) Int. Cl.
*F21V 7/04* (2006.01)
*G02F 1/1333* (2006.01)

(52) U.S. Cl. ........ 362/611; 362/618; 362/619; 362/607; 349/58; 349/60

(58) Field of Classification Search .................. 362/600, 362/606, 607, 616, 617, 618, 619; 349/58, 349/60, 65, 67, 70
See application file for complete search history.

(56) References Cited

U.S. PATENT DOCUMENTS

| | | | | |
|---|---|---|---|---|
| 5,889,570 | A * | 3/1999 | Mitsui et al. | 349/113 |
| 6,256,146 | B1 | 7/2001 | Merrill et al. | 359/500 |
| 6,517,914 | B1 * | 2/2003 | Hiraishi | 428/1.1 |
| 6,811,274 | B2 * | 11/2004 | Olczak | 362/606 |
| 7,004,610 | B2 * | 2/2006 | Yamashita et al. | 362/606 |
| 7,265,800 | B2 * | 9/2007 | Jagt et al. | 349/61 |
| 2003/0002153 | A1 | 1/2003 | Hiraishi et al. | 359/452 |
| 2003/0058386 | A1 | 3/2003 | Bastiaansen et al. | 349/100 |
| 2004/0234724 | A1 | 11/2004 | Kaminsky et al. | 428/141 |

FOREIGN PATENT DOCUMENTS

EP 1 143 270 A2 10/2001

OTHER PUBLICATIONS

Nitto Denko News Release, "Nitto Denko Develops Thermosetting Polymer with High Refractive Index", Nov. 11, 2003, http://www.nitto.com/company/release/03_11-1 1/index.html, 2 pages.
Patent Abstracts of Japan for JP 08327805, Ikeda Kenichi, published Dec. 13, 1996.
Patent Abstracts of Japan for JP 2001-249205, Kamikita Masakazu, published Sep. 14, 2001.
Patent Abstracts of Japan for JP 2003-302629, Murakami Osamu, published Oct. 24, 2003.

* cited by examiner

*Primary Examiner* — Jong-Suk (James) Lee
*Assistant Examiner* — David J Makiya

(57) ABSTRACT

A light transmitting diffusing sheet can be used in backlighting systems for liquid crystal displays (LCDs). Such displays are typically used in televisions, computer monitors, laptop computers and handheld devices such as mobile phones. Embodiments of the light diffusing sheets are suitable for use with both cold-cathode fluorescent (CCFL) and light emitting diode based backlighting systems. Desired light transmitting properties in the light transmitting diffusing sheet have been achieved by modifying both the volume and surface features of the sheet. Embodiments of this invention when used as part of the backlighting assembly for a LCD system results in improved brightness and controlled viewing angles. In one embodiment, substantially asymmetric particles in the volume of the sheet are combined with a ridged structure on one surface of the sheet. The use of the sheet removes the need for separate prismatic films and diffusing sheets, while also optimizing the light transmitting properties of these two elements.

23 Claims, 10 Drawing Sheets

ENHANCED LIGHT DIFFUSING SHEET

RELATED APPLICATIONS

This application is a continuation-in-part of PCT/US2005/031276, filed on Aug. 31, 2005. This application also claims the benefit of U.S. Provisional Application No. 60/605,956, filed on Aug. 31, 2004. The entire contents of each are incorporated herein by reference.

FIELD OF THE INVENTION

The invention generally relates to a light transmitting diffusing sheet and method of its manufacture and, more particularly, to the use of the same in backlighting systems for liquid crystal displays (LCDs). Such displays are typically used in televisions, computer monitors, laptop computers and handheld devices, such as mobile phones. These light diffusing sheets may be used with both cold-cathode fluorescent (CCFL) and light emitting diode (LED)-based backlighting systems.

BACKGROUND

When backlighting an LCD with cold-cathode fluorescent lamps, several diffusion films are often used in conjunction with prismatic films to try to bring more of the light toward the normal angle to the display to increase the brightness and contrast. However, using multiple films in this way increases the costs, cosmetic issues and thickness. In order to extract light from the waveguides in backlights, it is common to print diffusing white spots on the bottom of the waveguide; these spots reflectively diffuse light out of the waveguide. However, if no diffuser were used, these spots would undesirably leave a visible pattern. So, using a symmetric diffuser directly above the waveguide typically spreads light in all directions, and reduces the amount of light in the desired directions.

Some LCDs also employ a symmetric diffuser to spread the light out in both (i.e., x and y) directions in order to increase the viewing angle. These diffuser films, however, have their drawbacks; they do not adequately control the diffusion of light and result in decreased brightness, and usually send light in undesired, e.g., vertical, directions from an LCD, where viewers are not often looking. Asymmetric diffuser films can spread the light out in different directions, but these are typically present in LCDs as separate films or embossed or cast surface relief structures on films. Multiple films can add to the cost and complexity of the system and are undesirable in cost-conscious applications.

The increased optical efficiency of white and colored LEDs is making them a more appealing light source for LCD backlights. A significant difference between the CCFL and LED light sources is their coherence. CCFLs are closer to an extended source, while LEDs are more like a point source. As a result, the optical effect of speckle is more visible with LED sources than CCFLs. One method for reducing the appearance of speckle is to space diffusers apart. In a backlight, however, this typically increases the number of films, and light is scattered into undesirable angles, resulting in a decreased brightness.

SUMMARY

The present invention addresses the need in the art for enhanced diffusing sheets that can diffuse and direct light efficiently into desired directions, as well as reduce the appearance of speckle.

One embodiment of this invention relates to enhanced light diffusing sheets with light directing structures on at least one surface of the diffusing sheet. These light directing structures are prismatic structures that can direct light into desired directions. In one embodiment, the light directing prismatic structures provide improved collimation. In one embodiment, the invention relates to light diffusing materials featuring a light transmissive matrix having a refractive index, $n_1$, and having a prismatic array surface disposed thereupon; and light transmissive micro-bodies dispersed throughout the light transmissive matrix, having a refractive index, $n_2$, which is different from $n_1$. The light transmissive micro-bodies may be asymmetric or symmetric. In one embodiment, the major axes of the light transmissive micro-bodies may be aligned substantially perpendicular to the longitudinal direction of the prismatic array, or at an angle between perpendicular and parallel. The face of the sheet opposite the prismatic lenses may also have surface relief features designed to impart additional control of the light.

In another embodiment, the major axes of the light transmissive micro-bodies may be aligned substantially parallel to the longitudinal direction of the prismatic array. In yet another embodiment, the light diffusing material may include both symmetric and asymmetric light transmissive micro-bodies.

In an embodiment of the invention, the light diffusing material may have a prismatic array having symmetrical or asymmetrical prismatic features, or irregularly spaced symmetrical prismatic features. The light diffusing material of the invention may include at least one zone of light transmissive micro-bodies, the zone having a thickness that is less than the total thickness of the light diffusing material.

In another embodiment, the light diffusing material of the invention may include two zones of light transmissive micro-bodies with an intervening zone substantially free of micro-bodies.

DETAILED DESCRIPTION

Figure 2:
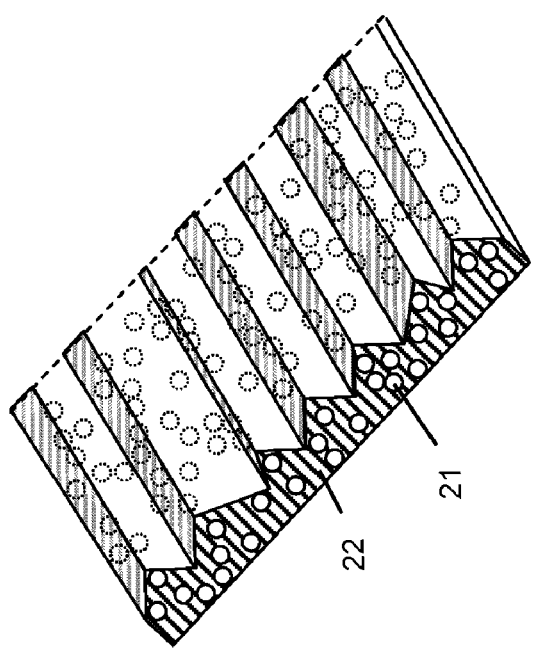
FIG. 2 is a perspective view of one embodiment of an enhanced light diffusing sheet with symmetric particles and a light collimating prismatic surface relief profile.

The features and other details of the invention will now be more particularly described. It will be understood that particular embodiments described herein are shown by way of illustration and not as limitations of the invention. The principal features of this invention can be employed in various embodiments without departing from the scope of the invention.

Definitions

For convenience, certain terms used in the specification and examples are collected here.

"Sheet" as used herein includes a thin or thick layer of material. A substantially thin sheet may can be used as a film, whereas a substantially thick sheet may be used as a plate or substrate.

"Speckle" includes scintillation or the optical interference pattern visible on a diffusing element.

"Speckle Contrast" is defined herein as the ratio of the standard deviation of the intensity fluctuation to the mean intensity over the area of interest.

"Diffuse" and "diffusing" as defined herein includes light scattering by reflection, refraction or diffraction from particles, surfaces, or layers or regions.

"Optically coupled" is defined herein as including the coupling, attaching or adhering two or more regions or layers such that the intensity of light passing from one region to the other is not substantially reduced due to Fresnel interfacial reflection losses due to differences in refractive indices between the regions. Optical coupling methods include joining two regions having similar refractive indices, or by using an optical adhesive with a refractive index substantially near or in-between the regions or layers such as Optically Clear Adhesive 8161 from 3M (with a refractive index at 633 nm of 1.474). Examples of optically coupling include lamination using an index-matched optical adhesive such as a pressure sensitive adhesive; coating a region or layer onto another region or layer; extruding a region or layer onto another region or layer; or hot lamination using applied pressure to join two or more layers or regions that have substantially close refractive indices. A "substantially close" refractive index difference is about 0.5, 0.4, 0.3 or less, e.g., 0.2 or 0.1.

"Prismatic" or "Prismatic sheet" or "Prismatic structure" is defined herein as a surface relief structure that refracts, diffracts, or scatters light toward a desired direction. This refraction can provide collimating properties to light passing through the film. The structure can include arrays of linear prism structures, micro-lens structures, pyramidal structures, lenticular lens arrays, and other surface relief structures. Cross-sectional profiles of such structures may appear as triangular, trapezoidal, parabolic, ellipsoidal, rectangular or other geometrical shapes. Prismatic structures also includes deviations from regular or irregular shapes, including for example, a microscopic wave surface enclosing a larger triangular cross-section.

"Imaging Material" is defined herein as one or a combination of materials that can be elements of a diffusing sheet.

"Hardcoating" or "Hardcoat" is a coating applied to a surface of a screen element that hardens the surface of the screen element, thus reducing the appearance of scratches and protecting the screen element. Hardcoats can include anti-glare or surface relief characteristics, or they can provide anti-glare properties when coated onto surface relief structures.

The "Gain" of a light scattering element is the ratio of the maximum luminance of an illuminated light transmitting material in a given direction relative to the luminance of a theoretically perfect diffuser in the same direction. To measure the gain of a particular sheet of material, a known amount of light is directed to the sheet, and the maximum luminance is measured using a standard luminance meter. The maximum luminance of light measured is then compared to a theoretically "perfect" diffusive material.

The gain for an imperfect diffuser is the value of the maximum luminance (ML) divided by the value of the luminance of the theoretically perfect diffuser. For a theoretically perfect transmissive Lambertian diffuser material, providing one foot-candle (10.76 lumen/m$^2$) of illumination to the material results in the luminance of one footlambert at all angles.

Therefore, if the maximum luminance by a material from transmitted light is equal to one footlambert, its gain with respect to a theoretical diffuser is 1.0 for that angle of transmission. For imperfect diffusers the gain will be maximum (ML) and larger than 1 for a given viewing direction (typically measured orthogonal to the plane of the diffuser).

Thus, a high gain screen will typically be brighter when viewed orthogonal to the plane than at other angles. Because the light transmitted by the material can never be more than the amount of light supplied, less light must be transmitted at angles other than the angle of maximum luminance.

"Angle of view" (AOV) is a measurement of illumination for all angles relative to two perpendicular axes in the plane of the material. These are called the X axis or the horizontal axis, and the Y axis or the vertical axis. The angle of view is measured by applying a "full-width at half maximum" approach, a "full-width at one-third maximum" approach, and a "full-width at one-tenth maximum approach." The AOV at full-width at half maximum ($\alpha(\frac{1}{2})$) is calculated from sum of the absolute value of the angles (measured from an orthogonal to the plane of the material) at which the measured luminance is one-half the maximum luminance measured and noted. For example, if angles of +35° and −35° were measured to have one-half the maximum luminance in the horizontal direction, the AOV $\alpha(\frac{1}{2})$ in the horizontal direction for the screen would be 70°. The AOV at full-width at one-third maximum ($\beta(\frac{1}{3})$) and the AOV at full-width at one-tenth maximum ($\lambda(\frac{1}{10})$) are calculated similarly, except that they are calculated from the angles at which the luminance is one-third and one-tenth of the maximum luminance respectively.

The "asymmetry ratio" is the horizontal AOV $\alpha(\frac{1}{2})$ divided by the vertical AOV $\alpha(\frac{1}{2})$, and thus is a measure of the degree of asymmetry between the horizontal luminance and the vertical luminance of the diffuser.

"Planarization" refers to the adding of a material to a surface relief pattern or structure to increase the flatness of the surface. This can be measured by the surface roughness. An increased flatness (lower surface roughness) can promote better adhesion and in some cases have improved optical, mechanical or physical performance.

A "micro-body" and "micro-bodies," as used herein, refer to confined regions having distinct boundaries of different optical or physical characteristics without regard to specific shapes and sizes. Typically, the region will have a different refractive index from the neighboring region in at least one of the x, y, or z directions. Examples of micro-bodies include domains, particles, particulates, dispersed phases, phases within a matrix of material, gaseous bubbles within a material, voids, spheres, microspheres, hollow microspheres, fibers, etc.

A "spheroidal" or "symmetric" particle includes those substantially resembling a sphere. A spheroidal particle may contain surface incongruities and irregularities but has a generally circular cross-section in substantially all directions. A spheroid is a type of ellipsoid wherein two of the three axes are equal. An "asymmetric" particle is referred to here as an "ellipsoidal" particle wherein each of the three axis can be a different length. Typically, ellipsoidal particles resemble squashed or stretched spheres.

In one embodiment of this invention, the light diffusing sheet is comprised of a light-transmissive matrix material. The matrix material may be chosen depending on the desired optical, physical, mechanical, processing and other characteristics desired. In one embodiment, the matrix materials used are preferably durable, stable, and allow optical coupling to other materials, such as a hardcoat, an anti-reflective coating, anti-blocking layer, uv absorbing layer, anti-static or a contrast enhancement layer. In one embodiment, the matrix material comprises asymmetric micro-bodies or other additives that do not significantly interfere with the basic function of the refractive optical element. Suitable matrix materials include acrylics, such as polymethylmethacrylates; polyesters; polystyrenes; polyolefins, such as polyethylenes, polypropylenes, and their copolymers; polyamides; organic acid cellulose esters, such as cellulose acetate butyrates, cellulose acetates, and cellulose acetate propionates; and polycarbonates. The matrix may also include compatibilizers to improve the processing and performance of the material. In a preferred embodiment, Spectar 14471 copolyester from Eastman Chemical Company may be used.

In one embodiment, the prismatic structure is made by embossing or casting a form into a light transmissive medium. In one example, a prismatic array is embossed into a sheet from a tool. In a further example, the form (or tool) is holographically mastered and then stamped or embossed into the material. The prismatic structure may also be made by exposure to radiation that ablates surface material or alters the physical, chemical, or optical properties to result in the prismatic structure. The prismatic structures typically have surface features larger than 2 μm in one or more directions such that the angle of the surface and the refractive index determine the output direction of light rays from a specific angle. The features smaller than 2 μm may also be random in shape, size or distribution in order to diffract the light in order to achieve unique color or angular properties. How to obtain such surface structures is well known in the art.

The prismatic structure may provide light collimating properties. In many applications, such as a backlight for an LCD, it is advantageous to collimate light from a light source that has diverging light rays in order to increase the luminance intensity normal to the display. Thus, the collimating features should re-direct a significant amount of the light incident from large angles into angles closer to 0 degrees from the direction perpendicular to the surface.

In one embodiment, the light diffusing material is made of a matrix material having a refractive index, $n_1$, having dispersed throughout the matrix asymmetric micro-bodies that have a refractive index, $n_2$, different from $n_1$. Volumetric scattering elements include asymmetric micro-bodies which scatter light in a controlled manner, asymmetrically shaped particles, graded-refractive index (GRIN) lenses or regions, holographically or optically formed asymmetric regions. The light scattering asymmetric micro-bodies within the bulk volume of material may vary in size, shape, concentration, distribution, and composition, providing that the refractive index within the volume of the material varies in the desired direction, e.g., x or y, sufficiently to asymmetrically scatter incident light. Example of asymmetric, volumetric scattering materials include stretched asymmetric particles in a host matrix material, radiation exposed photopolymers that enable refractive index variations, asymmetrically shaped voids or regions of materials or elements that differ in refractive index of the host matrix material, and embedded surface relief features.

The light diffusing material may also contain a surface relief structure on the other plane of the material wherein one of the two materials is air such that the refractive index is approximately 1.0. The asymmetric surface relief structure can be manufactured by techniques as described above, e.g., by embossing. In one embodiment, the surface relief contains asymmetrically shaped features predominantly aligned in the horizontal or vertical directions such that they refract, diffract, scatter, diffuse the incident light in the horizontal or vertical directions.

The thickness of the light diffusing material may affect the angular luminous intensity pattern, resolution, gain and speckle contrast. In one embodiment, the thickness is less than 10 mm. In another embodiment, the thickness may be less than 9, 8, 7, 6 or 5 mm. In another embodiment, the thickness may be less than 3 mm. In a more preferred embodiment, the thickness is less than 2 or 1 mm.

The asymmetric micro-bodies can be added to the matrix material during processing or they can be created during manufacturing. In one embodiment of this invention, particles not substantially asymmetric in shape may be stretched along an axis after coating or during or after an extruding process such that they become asymmetric in shape. Other methods for achieving a single region of asymmetric particles in a region are disclosed in U.S. Pat. No. 5,932,342, the text of which is incorporated herein by reference. By using multiple layers or multi-region methods such as co-extrusion, optical lamination, optical coupling, thermal bonding, multiple regions containing light scattering particles can be combined into a single light scattering element. The degree of stretching can control the asymmetry and thus achieve a desired level of asymmetric light scattering. The asymmetric particles may have a large variation in size depending on the desired level of asymmetry. Methods including co-extrusion, laminating, thermally bonding, etc., can be used to achieve multiple regions containing dispersed phases with improved optical performance. The dispersed phase material may blended with the continuous phase material in a compounding step, a tumbling mixer, in a solvent blending process, or within an extruder.

In one embodiment of the invention, the asymmetric particles in the light diffusing material are obtained by reducing particles in size in the x, y or other directions by stretching a film after or during extrusion.

In one embodiment of this invention the particles have a refractive index, $n_{p1}$, different from the host matrix material refractive index, $n_{m1}$, defined by at least one of $|n_{mx1}-n_{px1}| \geqq 0.001$, $|n_{my1}-n_{py1}| \geqq 0.001$, or $|n_{mz1}-n_{pz1}| \geqq 0.001$, to provide sufficient light scattering. The differential refractive index ($\Delta n_{MP}$), defined as the absolute value of the difference between the index of refraction of the matrix ($n_{M1}$) and the index of refraction of the particles ($n_{P1}$), or $|n_{M1}-n_{P1}|$, may be from about 0.005 to about 0.2, and, in particular embodiments, is from about 0.007 to about 0.1 in the x, y, or z directions.

When more than one type of asymmetric bodies are used within a light diffusing sheet, the asymmetric bodies may have a refractive index, $n_{p2}$, in the x, y, or z direction that is the same as or different to that of the continuous phase or that of the dispersed phase.

In one embodiment of this invention, the asymmetric features, e.g., micro-bodies, typically are all oriented with their major axes substantially in one direction in the plane of the surface of the material. In a further embodiment, the particles are made from a material that is capable of being deformed at a processing temperature in order to create their non-spheroidal shape by stretching. The shape may resemble a non-spheroidal ellipsoid; or shapes that have non-constant radii in the x, y, or z direction may also be formed. For example, the domains may appear randomly shaped in one plane (amoeba-like) and substantially planar in a perpendicular plane. Further, in one embodiment of this invention, the volume density of the microbody, the average size and shape, and the index of refraction in the x, y, and z directions is optimized to control desired properties of the material.

The average dimension of a dispersed domain or particle in the x, y, or z direction in the matrix may be from about 1 μm to about 30 μm, about 2 μm to about 15 μm, or from about 2 μm to about 5 μm in the minor dimension.

The average dimension of a dispersed domain or particle in the x, y, or z direction in the matrix may be from about 2 μm to about 2 cm, about 5 μm to about 1 cm, or about 10 μm to about 500 μm in the major dimension.

The differential refractive index ($\Delta n_{ME}$), defined as the absolute value of the difference between the index of refraction of the matrix ($n_M$) and the index of refraction of the ellipsoidal particles ($n_E$), or $|n_M-n_E|$, may be from about 0.005 to about 0.2, and, in particular embodiments, is from about 0.007 to about 0.1 in the x, y, or z direction.

Suitable materials for the particles include acrylics, such as polymethylacrylates; polystyrenes; polyethylenes; polypropylenes; organic acid cellulose esters, such as cellulose acetate butyrates, cellulose acetates, and cellulose acetate propionates; polycarbonates; or silicones. The particles may also contain coatings of higher or lower refractive index materials, or the particles may be hollow materials containing a gas mixture, such as air. In one embodiment of this invention, polyethylene is used for the particle material.

Other suitable materials for the transmissive micro-bodies include those that are not deformed during the extrusion or manufacturing process. These include spheroidal and non-spheroidal materials that have fibrous, plate-like or other orientable shapes. These also include inorganic fibrous material, glass fibers, mica, silica, cross-linked polymers, plate-like materials, and fibrous polymer materials with high melting points or high glass transition temperatures. The micro-bodies may be aligned during the manufacturing process; for example, the micro-bodies may be aligned due to stretching or extruding the region containing the dispersed micro-bodies.

In one embodiment, a vertically-oriented prismatic array (the major axis of the prismatic array is in the y direction) is optically coupled to a region containing asymmetric micro-bodies aligned in the x or horizontal direction, wherein the incident light refracts in the x-z (horizontal) plane due to the lenticular lens and scatters in the y-z (vertical) plane due to the asymmetric scattering region. Thus, the collimated incident light will be spread in the vertical direction and focused in the horizontal direction. The scattering is in a direction parallel to the transparent stripes and lenticules that are needed for the contrast enhancement in the controlled light transmissive region. In one embodiment, the asymmetric microbodies are oriented horizontally (i.e., perpendicular to the lenticules) so the scattering is substantially in the vertical direction (i.e., parallel to the lenticules). Thus, the collimated light is focused through the asymmetric micro-bodies with the light scattering only in the vertical direction.

The alignment of the asymmetric micro-bodies can also vary. By aligning the particles with respect to the prismatic structure at angles other than parallel or perpendicular, other asymmetric viewing angles can be achieved. The asymmetric micro-bodies will inevitably cause some scattering in the minor axis. This scattering may be designed to be very small, or significant. In one embodiment, the scattering in the minor axis is chosen to be just sufficient to diffuse the specular component of the light source in the plane perpendicular to major axis of the prismatic structure.

In one embodiment of this invention, multiple-element diffusers in accordance with the invention are optically coupled to one another, i.e., so the intensity of light passing from one region to the other is not substantially reduced due to Fresnel interfacial reflection losses due to differences in refractive indices between the regions. Optical coupling methods include joining two regions having similar refractive indices, or by using an optical adhesive with a refractive index substantially near or in-between the elements or layers.

Particles that are significantly smaller than the wavelength of light may be added to alter the effective refractive index. In one embodiment, the size of the particles are less than $\frac{1}{10}^{th}$ the wavelength of light. In a further embodiment, the size of the particles are less than $\frac{1}{20}^{th}$ the wavelength of light of interest such that significant additional scattering (forward or backward) does not take place. These particles may be symmetric, asymmetric, or random in shape. For example, very fine particles of titanium dioxide may be added to a material to increase the effective refractive index of the material. The effective refractive index change can adjust the scattering properties of the material, refractive properties, and the interfacial reflections.

The diffusers of the invention may also include an optional hardcoat to increase the stability of the element, and/or an optional anti-reflective coating. The hardcoat may be any light-transmissive support layer, such as a siloxane-based polymer layer.

One or more embodiments of the present invention relate to an enhanced light diffusing sheet with collimating features. The collimating features may be in the form of prismatic structures arranged in a linear array. The light diffusing properties may be asymmetric or symmetric in nature. The diffusing property can be achieved by volumetric scattering by symmetric particles, asymmetric particles, or combinations of both. The light diffusing regions within the sheet may also contain multiple light scattering regions wherein the regions are spaced apart within the sheet by a substantially non-diffusing region. Additional surface relief structures can be used on the face opposite the prismatic structures. One or more of the light scattering regions may be located within the prismatic elements, the substrate of the sheet, or in both regions. In another embodiment of this invention, a LCD backlight employs at least one enhanced light diffusing sheet. Further embodiments include LCD displays that may also contain additional diffuser films (e.g., symmetric, asymmetric, volumetric or surface relief).

Figure 1:
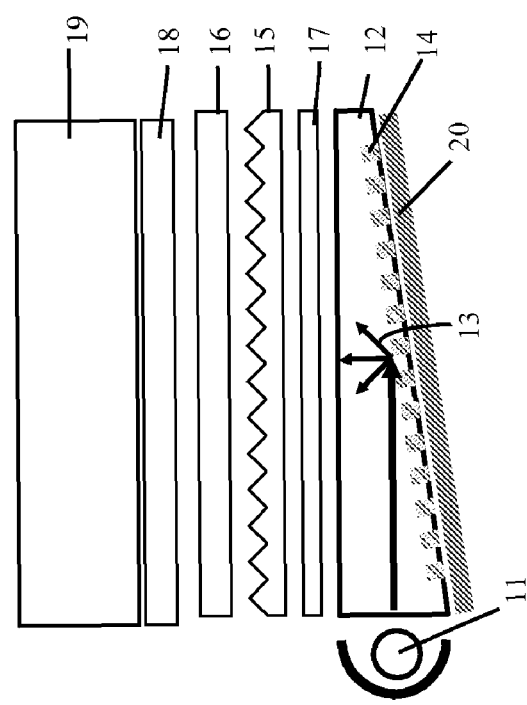
FIG. 1 is a schematic cross-sectional side view of a traditional liquid crystal display and backlight.

FIG. 1 illustrates one example of prior art. Light from a CCFL lamp 11 is directed into a waveguide 12. The light 13 reflecting from the white dots 14 is scattered out of the waveguide 12 and a portion of this light is directed toward a first 15 and second 16 substantially transparent, non-diffusing crossed prismatic films after passing through a diffuser 17. A commonly used prismatic film is 3M's Brightness Enhancement Film (BEF). These two crossed prismatic films collimate a portion of the light by directing more of the light toward the normal direction of the liquid crystal display. The light is then further diffused by the symmetric diffuser 18 before entering the liquid crystal display panel 19.

FIG. 2 illustrates one embodiment of this invention wherein an enhanced light diffusing sheet is composed of symmetric particles 21 of a refractive index different to that of the host matrix polymer 22 and wherein the diffusing sheet contains light collimating features in the form of prismatic structures formed on one surface. These prismatic structures may have a non-regular pitch as indicated in order to reduce the appearance of Moiré. By placing the diffusing particles within the sheet with the prismatic structure, a separate film is not needed, thus reducing manufacturing costs. Additionally, there are no Fresnel reflections from the interface between the diffuser and the prismatic structure as there is in the case of the prior art described in FIG. 1. This increases the optical efficiency of the backlight and brightness of the display.

Figure 3:
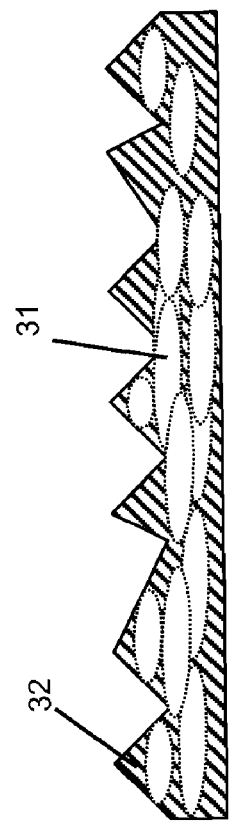
FIG. 3 is a schematic cross-sectional side view of one embodiment of an enhanced light diffusing sheet with a light collimating prismatic surface relief profile and asymmetric particles aligned perpendicular to the prisms.

FIG. 3 illustrates another embodiment of a light diffusing sheet wherein the light diffusing region contains asymmetric particles 31 within the matrix material 32 aligned substantially perpendicular to the prismatic structures. By orienting the asymmetric particles perpendicular to the prismatic structures, light passing through the sheet will be substantially collimated in one direction and diffused in the other. This allows for increased control of the light when used with an optical system such as an LCD.

Figure 4:
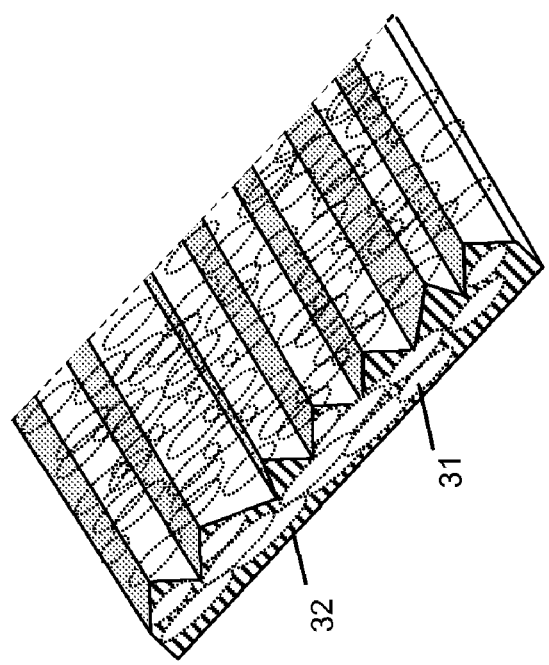
FIG. 4 is a perspective view of the embodiment of FIG. 3.

FIG. 4 illustrates a perspective view of the embodiment of FIG. 3.

Figure 5:
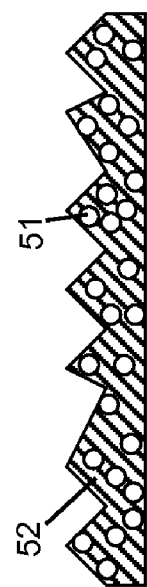
FIG. 5 is a schematic cross-sectional side view of one embodiment of an enhanced light diffusing sheet with a light collimating prismatic surface relief profile and asymmetric particles aligned parallel to the prisms.

FIG. 5 illustrates a further embodiment of a light diffusing sheet wherein the light diffusing region contains asymmetric particles 51 within a matrix material 52 aligned substantially parallel to the prismatic structures. In this embodiment, light diffusing and collimating in one direction (horizontal, for example) can be accomplished by one light diffusing sheet without affecting the spread or collimation of light in the vertical direction. This can be advantageous because in some LCD configurations it may be desired to control the light properties in each direction independently.

Figure 6:
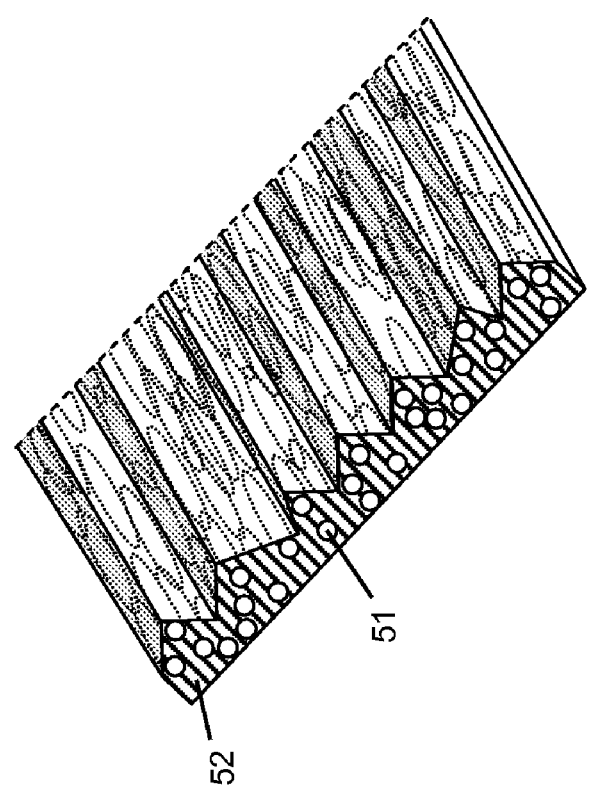
FIG. 6 is a perspective view of the embodiment of FIG. 5.

FIG. 6 illustrates a perspective view of the embodiment of FIG. 5.

Figure 7:
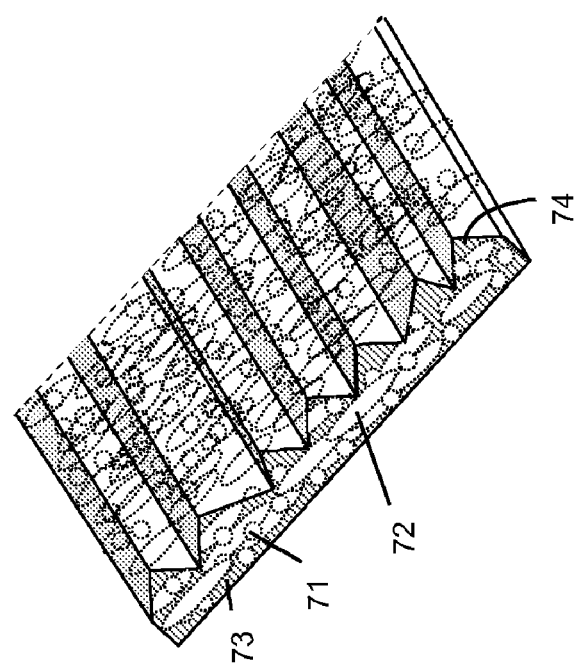
FIG. 7 is a perspective view of one embodiment of an enhanced light diffusing sheet containing asymmetric and symmetric particles with a light collimating prismatic surface relief profile.

FIG. 7 illustrates a further embodiment of a light diffusing sheet wherein the light diffusing region contains symmetric particles 71 and asymmetric particles 72 disposed within the matrix material 73 that are aligned substantially perpendicular to the prismatic structures 74. By combining symmetric particles and asymmetric particles in the same light diffusing sheet, precise control over the diffusion in the horizontal and vertical directions can be achieved in one sheet. In most LCDs, some amount of diffusion is needed in the vertical direction while more is typically needed in the horizontal direction. The symmetric particles can provide a base amount of diffusion in the horizontal and vertical direction while the asymmetric particles can increase the diffusion in the horizontal direction only. The asymmetric particles may also be aligned parallel to the prismatic structure or at a predetermined angle relative to the prismatic structures.

Figure 8:
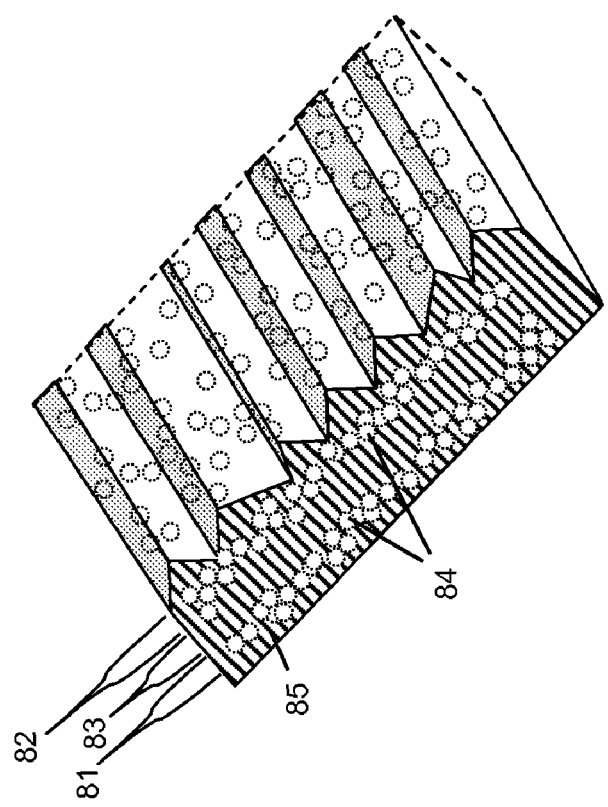
FIG. 8 is a perspective view of one embodiment of an enhanced light diffusing sheet with a light collimating prismatic surface relief profile that contains two regions with symmetric light scattering particles separated by a non-scattering region.

FIG. 8 illustrates another embodiment of a light diffusing sheet wherein two light diffusing regions 81 and 82 are spaced apart by a non-diffusing region 83 contain symmetric particles. These diffusing regions, also called zones, are regions of a continuous phase material that contain dispersed phase particles 84 in a matrix material 85. The boundaries of these zones are defined by regions containing a concentration (or concentration range) of particles. In the case of non-scattering zones, the concentration of particles is typically less than 2%, 1%, or 0.5%, depending on the desired optical characteristics and materials used. In the case of a scattering zone, the concentration of dispersed phase domains is typically greater than 0.5%, 1%, or 2%, depending on the desired optical characteristics and materials used. These boundaries may correspond to interfacial boundaries, such as those of the prismatic structure, substrate, pressure sensitive adhesive, or other feature. These zones create a multi-region light diffusing material. By using more than one zone with dispersed domains, the speckle contrast of the light from the backlight is reduced. With a reduced speckle contrast, the light diffusing sheet offers an improved uniform illumination source for a display such as an LCD. Additionally, reduced speckle contrast also increases the display contrast. Details of this effect and possible other configurations, and methods of manufacture and measurement are described in U.S. Provisional Patent Application No. 60/598,826 (to which priority was claimed in U.S. Ser. No. 11/197,246). It can be appreciated that the multi-phase element, as described in the '826 application for a projection screen, can be used as a light diffusing sheet in a backlight for an LCD. The visibility of speckle contrast depends on the bandwidth and coherence length of the light source. Generally, the minimum visible modulation depth for a light and dark pixel of a display is 20% (as defined by Goldenberg et al., "Rear Projection Screens for Light Valve Projection Systems," SPIE Vol. 3013, 1997, pp. 49-59, incorporated herein by reference). An acceptable level for speckle contrast may be more or less depending on the light source, display properties, image display. In one embodiment, the speckle contrast is less than 80%, 50% or 20%. In a preferred embodiment, the speckle contrast is less than 10%.

The reduced speckle contrast also improves the uniformity of the light pattern from a light diffusing sheet. A generally accepted threshold for the luminance variation for a display that can be tolerated is 70%. The multi-region light diffusing material with prismatic structures increases the display uniformity.

Figure 9:
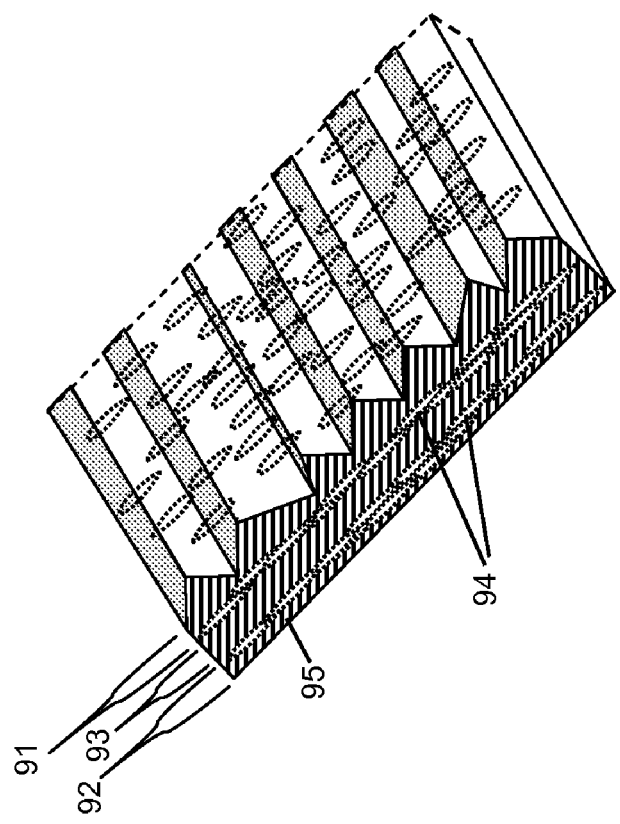
FIG. 9 is a perspective view of one embodiment of an enhanced light diffusing sheet with a light collimating prismatic surface relief profile that contains two regions with asymmetric light scattering particles separated by a non-scattering region.

FIG. 9 illustrates another embodiment of a light diffusing sheet wherein two light diffusing regions 91 and 92 spaced apart by a non-diffusing region 93 contain asymmetric particles 94 in a matrix region 95. In this embodiment, light passing through the light diffusing sheet is diffused substantially in one direction and collimated in the other direction. By using a multi-phase region, the speckle contrast of the diffuse light is reduced; and, therefore, the visibility of speckle in the LCD image is reduced. Other configurations are possible wherein symmetric and asymmetric particles are contained in one or more of the light diffusing regions. The regions may contain asymmetric particles that are at an angle, θ, with respect to each other. More than two light diffusing regions may be designed to further reduce the speckle contrast.

Figure 10:
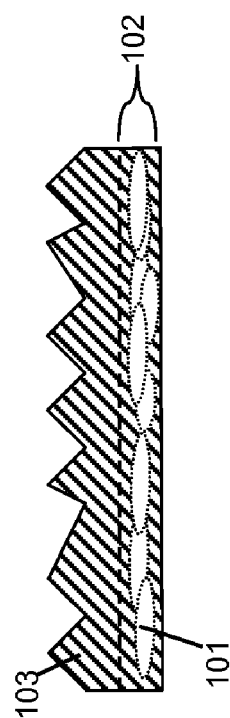
FIG. 10 is a schematic cross-sectional side view of one embodiment of an enhanced light diffusing sheet with a light collimating prismatic surface relief profile and asymmetric particles aligned perpendicular to the prisms located within the substrate of the sheet.

FIG. 10 illustrates an embodiment of a light diffusing sheet wherein the asymmetric particles 101 are located within the substrate 102 of a prismatic sheet 103. In another embodiment, a method for producing an enhanced light diffusing sheet includes extruding and stretching a film containing particles such that the resulting film contains asymmetric particles. A light curing resin can be coated onto the film with the prismatic structures cast into the resin by UV exposure of the resin while in contact with a tool or drum with the corresponding reversed structure.

Figure 11:
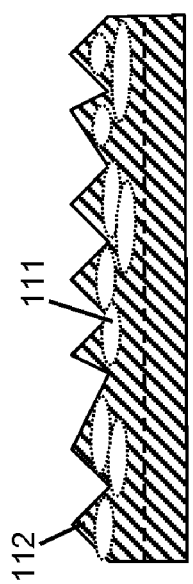
FIG. 11 is a schematic cross-sectional side view of one embodiment of an enhanced light diffusing sheet with a light collimating prismatic surface relief profile and asymmetric particles aligned perpendicular to the prisms located within the prism structures.

FIG. 11 illustrates an embodiment of a light diffusing sheet wherein the asymmetric particles 111 are located within the prismatic structures 112. In another embodiment of this invention, the light diffusing regions illustrated in FIG. 10 and FIG. 11 may be multi-phase diffusing regions. In another embodiment of this invention, a method for producing an enhanced light diffusing sheet includes extruding and stretching a film containing particles such that the resulting film contains asymmetric particles. The film is either maintained or is transitioned to a malleable state, and the prismatic features may be embossed, molded, stamped, or cast into the film. In another embodiment, the film may be cast into a mold, drum, or other structure containing the reverse image of the prismatic structure desired.

Figure 12:
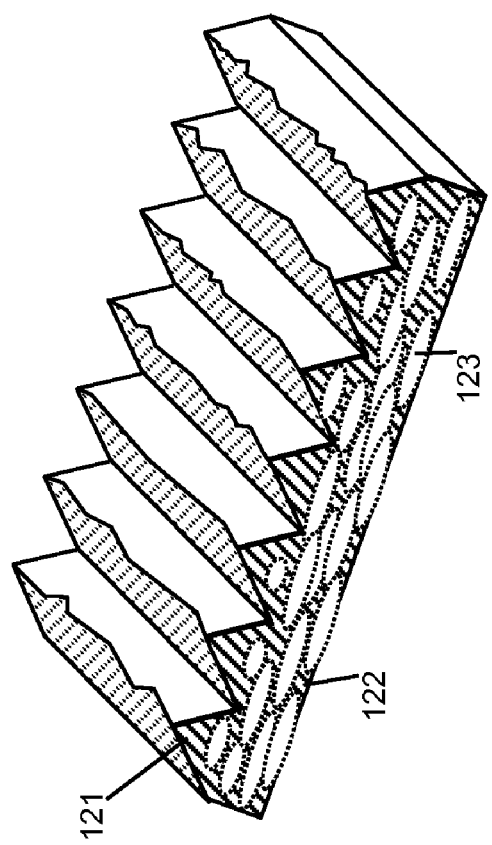
FIG. 12 is a perspective view of one embodiment of an enhanced light diffusing sheet containing asymmetric particles with a light collimating prismatic surface relief profile wherein the height of the prism profiles varies along the length of the prisms.

FIG. 12 illustrates an embodiment of a light diffusing sheet wherein the height of the prismatic structures 121 varies lengthwise along the prisms and a matrix region 122 contains asymmetric particles 123. By varying the height of the prisms, other films in contact with the sheet do not produce undesirable optical effects such as Moiré. In another embodiment of this invention, the pitch of the prisms is non-constant. The pitch can be randomly chosen or it can be pre-determined to be a non-regular spacing. The apex angle of the prisms can also vary with a regular or irregular pitch. The pitch of the prisms can also vary lengthwise along the prisms. The prisms can extend at an angle relative to the edge of the film. This orientation angle can vary across the surface randomly. With other prismatic surfaces such as microlens arrays, the radius and height of the lens may vary regularly or randomly. By reducing the regularity of a feature of the prismatic structure, optical effects such as Moiré can be reduced. The feature variations (whether regular, random or semi-random) are within a range of values that aid in achieve the desired optical effect. Combinations of these variations on the prismatic structure can be envisioned and are incorporated herein.

Figure 13:
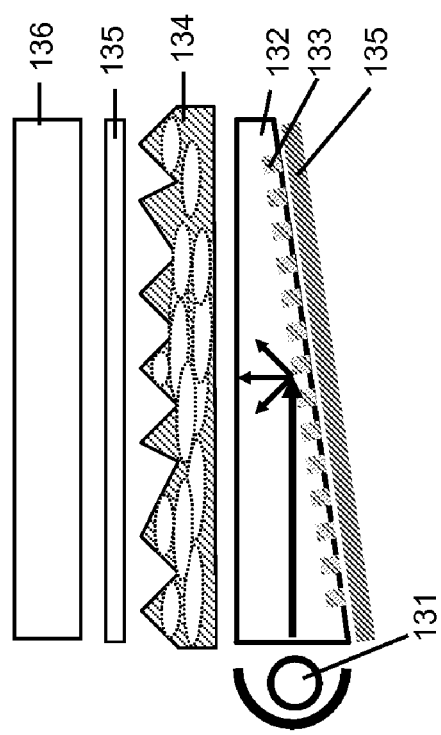
FIG. 13 is a schematic cross-sectional side view of one embodiment of a liquid crystal display with an enhanced light diffusing sheet located between the waveguide and a prismatic film.

FIG. 13 illustrates an embodiment of a liquid crystal display with a backlight incorporating the light diffusing sheet of FIG. 3. The light from a CCFL 131 is directed through the edge of a waveguide 132 containing white printed dots 133 underneath. The light in the waveguide scatters from the dots such that it escapes out of the waveguide 132 toward the enhanced light diffusing sheet 134 or is reflected toward the reflective film 135 such that it continues to reflect or scatter. The light diffusing sheet 134 diffuses the light in the horizontal direction and substantially collimates the light in the vertical direction. The light then passes through a separate prismatic film 135 such as BEF (3M) located above the enhanced light diffusing sheet and some of the light diffusing in the horizontal direction is collimated. The resulting light profile is spatially modulated to form an image by passing through the display panel of an LCD 136. The BEF film is optional and may not be necessary depending on the desired viewing angle and intensity of the LCD. By combining the light diffusing features and the collimation properties within the same film, fewer sheets in the backlight can be used, thus simplifying manufacturing and reducing costs.

Other LCD or flat panel displays can be illuminated by a backlight incorporating the light diffusing sheet of this invention. Direct-lit backlights where the light sources are on the opposite side of the light diffusing sheet may also use the enhanced light diffusing sheet of this invention. The lightguide may be illuminated from the edge, from within (as in the case of side emitting LEDs), or from behind. A diffusion plate may be used with the direct-lit backlight. The light diffusing sheet of this invention may be used to replace the diffusion plate, or it may be used in addition to the diffusion plate to control the light distribution, luminance, or speckle contrast.

Figure 14:
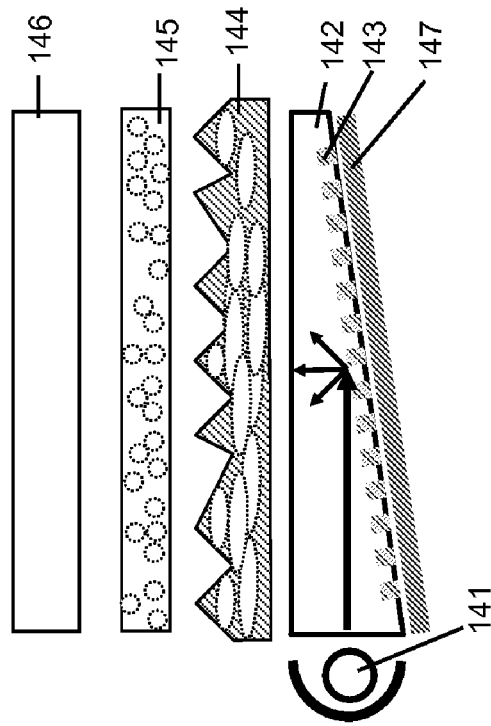
FIG. 14 is a schematic cross-sectional side view of one embodiment of a liquid crystal display with two crossed enhanced light diffusing sheets located between the waveguide and the first polarizer.

FIG. 14 illustrates an embodiment of a liquid crystal display with a backlight incorporating the light diffusing sheets of FIG. 3 and FIG. 5. The light from a CCFL 141 is directed through the edge of a waveguide 142 containing white printed dots 143 underneath. The light traveling within the waveguide 142 scatters from the dots out of the waveguide 142 or is reflected toward the reflective film 147 such that it continues to reflect or scatter toward the first 144 and second 145 enhanced light diffusing sheets with prismatic structures. The first light diffusing sheet diffuses the light in the horizontal direction and substantially collimates the light in the vertical direction. The second light diffusing sheet diffuses the light in the vertical direction and substantially collimates the light in the horizontal direction. The resulting light profile is spatially modulated to form an image by passing through the liquid crystal display panel 146. In this configuration, the two enhanced light diffusing sheets replace two diffuser films and the two prismatic films used in the traditional configuration of FIG. 1 and offer a more controllable viewing angle.

Figure 15:
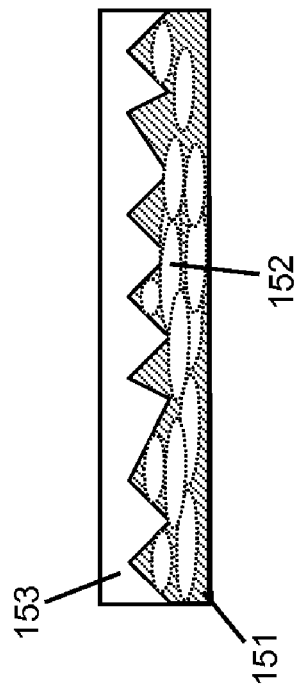
FIG. 15 is a schematic cross-sectional side view of one embodiment of an enhanced light diffusing sheet containing asymmetric particles with a prismatic surface relief profile in a high refractive index material and a low refractive index planarization layer optically coupled to the surface relief profile.

FIG. 15 illustrates an embodiment of a light diffusing sheet wherein asymmetric particles 152 with a refractive index of $n_{dx}$, $n_{dy}$, $n_{dz}$ 152 are encapsulated within a high refractive index matrix material 151 with a refractive index of $n_{1x}$, $n_{1y}$, $n_{1z}$ which also forms the refractive prismatic structures at the interface with the low refractive index material 153. The low refractive index material has a refractive index of $n_{2x}$, $n_{2y}$, $n_{2z}$ and can be used to planarize the prismatic surface relief structure. The low refractive index material can be an aerogel, sol-gel or plastic with microscopic pores. In one embodiment, the low refractive index material is a fluoropolymer. The high refractive index material can be commonly known high refractive index polymers or other material such as Nitto Denko's high-refractive index thermosetting polymer capable of reaching a refractive index of 1.76 (Nitto Denko Press Release, 11 Nov. 2003, at http://www.nitto.com/company/release/03_11_11/index.html). By using a high and low refractive index material, the enhanced light diffusing sheet can be planarized while retaining it's refractive power. In one embodiment, the difference in the refractive index $|n_1-n_2|$ is at least 0.01 and provides refractive power for improved angular performance, such as improved collimation. The difference in refractive index allows the planarized light diffusing sheet to be optically coupled to a non-planarized enhanced light diffusing sheet as in FIG. 16.

Figure 16:
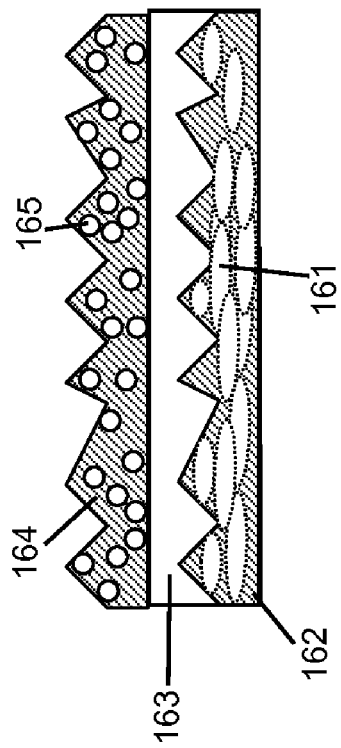
FIG. 16 is a schematic cross-sectional side view of one embodiment of an enhanced light diffusing sheet containing the enhanced light diffusing sheet of FIG. 3 optically coupled to the enhanced light diffusing sheet of FIG. 15.

FIG. 16 illustrates an embodiment of this invention comprising a light diffusing sheet with asymmetric particles 161 within a high refractive index material 162. The light diffusing sheet is disposed in contact with a low refractive index material 163 upon which a matrix material 164 is disposed containing asymmetric particle 165.

Figure 17:
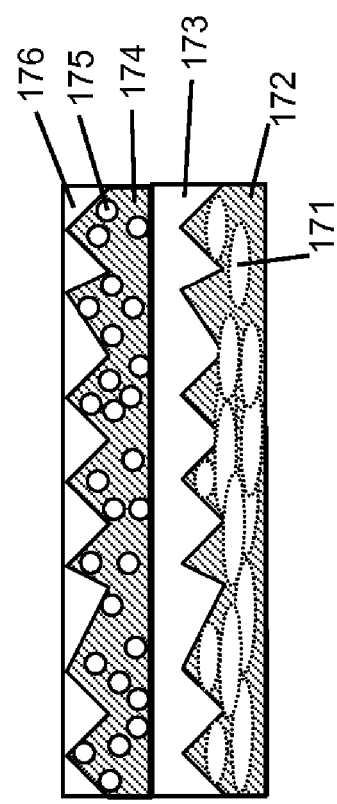
FIG. 17 is a schematic cross-sectional side view of one embodiment of an enhanced light diffusing sheet containing two of the enhanced light diffusing sheets of FIG. 15 optically coupled and crossed.

FIG. 17 shows a further embodiment of this invention wherein the light diffusing sheet comprises first asymmetric particles 171 within a first high refractive index matrix material 172 a first low refractive index material 173 disposed upon the second high refractive index matrix material 174 comprising the second asymmetric particles 175. The light diffusing sheet also comprises a second low refractive index material 176 disposed on the other side of the second high refractive index material 174. In one embodiment, the materials are optically coupled. By optically coupling the materials, costs savings can be realized in construction, manufacturing, distribution and other areas. Also, the planarized films are less susceptible to dirt and dust buildup during the sheet manufacturing and LCD construction process. An absorbing or reflecting polarizer may be optically coupled to the planarized sheets in order to further consolidate the optical films. The planarization region may be an adhesive or other material to improve the bonding or surface contact area for combining with another element. It may also provide improved optical, physical, or mechanical benefits.

Figure 18:
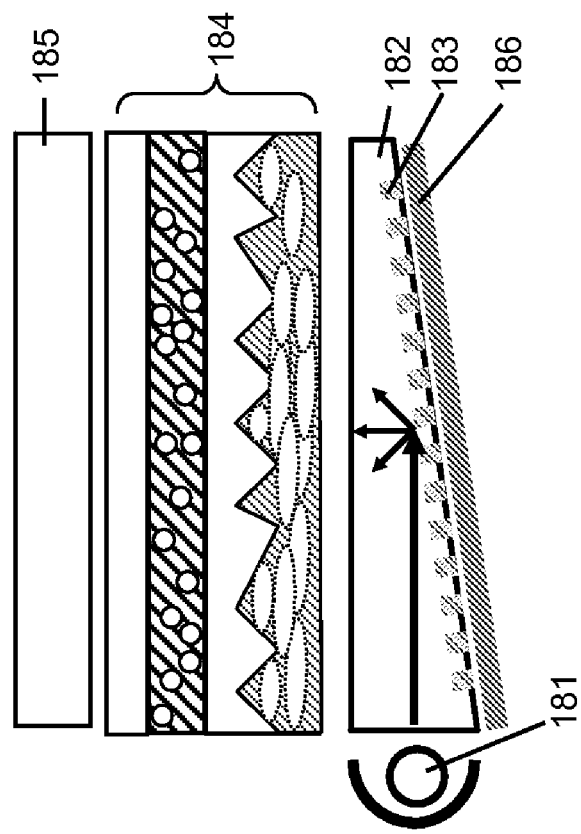
FIG. 18 is a schematic cross-sectional side view of one embodiment of a liquid crystal display with two crossed enhanced light diffusing sheets located between the waveguide and the first polarizer.

FIG. 18 illustrates an embodiment of a liquid crystal display with a backlight incorporating the light diffusing sheet of FIG. 17. The light from a CCFL 181 is directed through the edge of a waveguide 182 containing white printed dots 183 underneath. The light traveling within the waveguide 182 scatters from the dots out of the waveguide 182 or is reflected toward the reflective film 186 such that it continues to reflect or scatter toward the light diffusing sheet 184. The resulting light profile is spatially modulated to form an image by passing through the liquid crystal display panel 185. The optical performance of the system can be similar to that of FIG. 14, however, the enhanced light diffusing sheets can be provided to the LCD manufacture as one sheet, thus simplifying construction and reducing costs.

Figure 19:
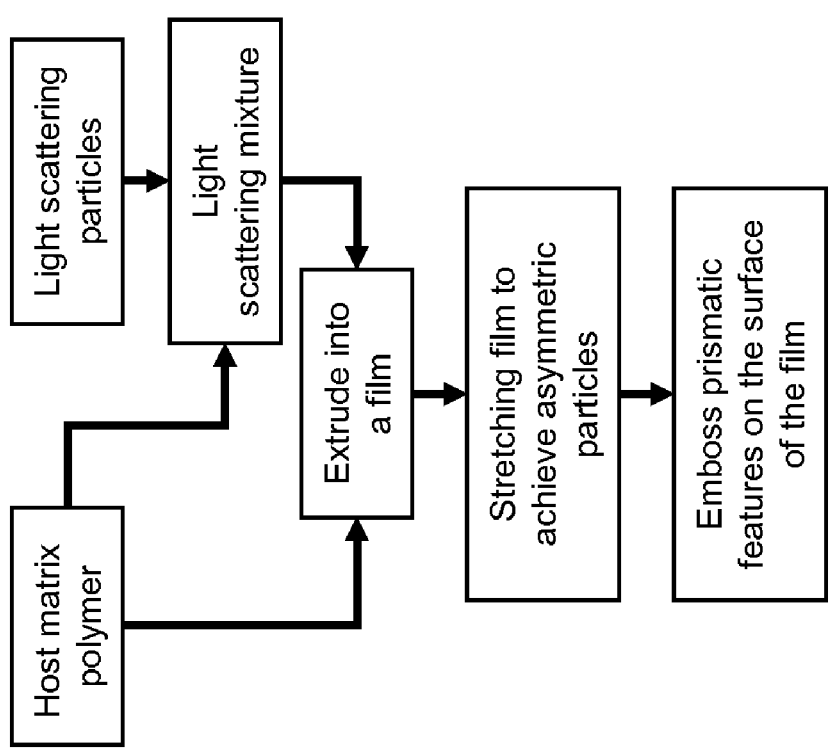
FIG. 19 is a flow diagram illustrating the steps of one embodiment of a method for producing the imaging material of FIG. 3.

FIG. 19 illustrates one embodiment of this invention for the method of producing the enhanced light diffusing sheet of FIG. 3. Particles capable of scattering light are combined with a polymer matrix material to form a light scattering mixture. This mixture is extruded with the polymer matrix material into a film. This film is stretched to produce asymmetry in the shapes of the light scattering particles. The prismatic structure is then embossed onto the film such that prismatic structures of the desired shape, pitch, apex angle, height and prism orientation are created. Other methods for achieving the asymmetric light scattering film include alignment by stretching and particle confinement. Various methods for achieving asymmetric light scattering films are known to those in the art and some are described in U.S. Ser. No. 60/605,956. Methods of achieving the asymmetric diffusion element described therein can be used in addition to methods for achieving a prismatic structure on the element (or film) to create an enhanced light diffusing sheet. Methods for achieving the prismatic structures for the various embodiments described in this invention include cold embossing, hot embossing, casting, ablation, lamination and other methods for achieving a surface relief structure in a polymer known to those in the field. In the embodiments including a high and low refractive index material, either material may be cast with the desired or reverse features and optically coupled to the other material. In this configuration, optical coupling can be obtained using, e.g., planarization techniques, such as coating and other techniques known to those in the industry. It is also possible to emboss into a coating applied to the surface of the film rather than directly into the film itself. A typical process involves the use of a UV cured coating that is irradiated with ultraviolet light once the embossing master is in place. An alternative process uses laser based marking. For instance, an excimer laser can be used to selectively ablate regions in the surface of the film. Such a process would not require any embossing master.

Figure 20:
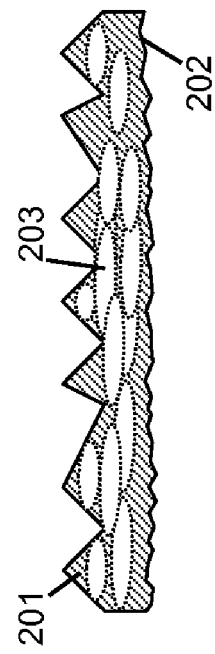
FIG. 20 is a schematic cross-sectional side view of one embodiment of an enhanced light diffusing sheet with asymmetric particles and a light collimating prismatic surface relief profile on one face of the sheet and a surface relief structure on the opposite face.

FIG. 20 illustrates an embodiment of a light diffusing sheet comprising asymmetric particles 203 wherein one face of the sheet has a prismatic structure 201 and the opposite face has a surface relief structure 202. This structure may help alleviate the appearance of undesired optical artifacts such as Newton's rings and Moiré. The surface relief structure may be a prismatic structure as defined herein similar to the one on the opposite face or a different prismatic structure. The surface relief structure may be a microlens array, a ruled (or "scratched") pattern, a holographic surface relief diffuser pattern. The relief structure may have regular, irregular, or random features (such as shape, size, location, angle, height).

The different variations in features and designs of the enhanced light diffusing sheet described herein can be envisioned and include one or more combinations of the features described below:

1. Prism Pitch: Constant; non-constant (irregular); random.
2. Prism Orientation: At an angle, $\phi$, with respect to a predetermined edge; or at an angle, $\phi2$, wherein $\phi2$ varies across the length of the prisms.
3. Prism height: Constant; varying lengthwise across the length of the prisms; varying from one prism to another.
4. Prism Apex angle: At a constant angle, $\alpha$; or at an angle, $\alpha2$, wherein $\alpha2$ varies across the length of the prisms; or at an angle, $\alpha3$, wherein $\alpha3$ can vary from one prismatic structure to the next.
5. Prism structure refractive index: $n_m$, with the region in optical contact with the prism structure having a refractive index, $n_1$, wherein $n_m > n_1$.
6. Diffusing particle shapes: Symmetric; or asymmetric particles; or a combination of both.
7. Diffusing particles refractive index: average refractive index $n_p$ wherein $|n_p - n_m| > 0.001$; refractive index, $n_{px}$ and $n_{py}$, in the x and y directions respectively, wherein $|n_{px}-n_m|>0.001$; $|n_{py}-n_m|>0.001$; or $|n_{py}-n_m|>0.001$ and $|n_{px}-n_m|>0.001$.

8. Diffusing particles location: In the prismatic structures; in the substrate of the prismatic structures; in both the prismatic structures and in the substrate; in regions of the substrate or prismatic structures wherein the regions are separated by a non-diffusing region (multi-phase).

9. Asymmetric particle alignment: substantially parallel to the prisms; substantially perpendicular to the prisms; or at an angle, β, with respect to the prisms.

10. Surface structure on sheet face opposite prism face: planar; prismatic; microlens array; surface relief structure providing pre-determined angular scattering (included ruled structure, holographic diffuser); any combination of the above structures.

Other liquid crystal display configurations can be envisioned within the scope of this invention. These include the adding volumetric or surface relief diffusers in locations between the waveguide and the lower polarizer of the LCD.

Preferred embodiments of the present invention are illustrated in the following Examples. The following examples are given for the purpose of illustrating the invention, but not for limiting the scope or spirit of the invention.

EXAMPLE 1

A light diffusing sheet, in accordance with the present invention, can be produced as shown in FIG. 9, and designed to be used in an LCD backlighting assembly as shown in FIG. 13, with the required outcome being to improve the brightness of the LCD and to further control its viewing angle. The diffusion resulting from the asymmetric particles in the volume of the sheet can be optimized to the extent that a secondary diffusing sheet is no longer required. Typically, this may require a diffusion profile of +/−5 degrees full width half maximum (FWHM) by +/−15 degrees FWHM. Such a diffusion performance can be achieved by distributing asymmetric polystyrene beads, of an average diameter in one axis of 5 μm, in a host matrix of polypropylene or acrylic. Desired performance is further realized when this optimized diffusion profile is used in conjunction with a ridged surface structure, whereby the ridges have random pitch and depth but have an enclosed angle at the apex of each ridge close to 90 degrees. The ridged structure can be produced by either embossing directly into the diffusion sheet or by embossing into a UV cured coating applied to the sheet.

EXAMPLE 2

A light diffusing sheet, in accordance with the present invention, can be produced as shown in FIG. 15, and designed to be laminated to the back of the LCD with the required outcome being to improve the brightness of the LCD and further control its viewing angle. The sheet is based upon optimizing the diffusion resulting from the asymmetric particles in the volume of the sheet to the extent that a secondary diffusing sheet is no longer required. Typically, this may require a diffusion profile of +/−5 degrees full width half maximum (FWHM) by +/−15 degrees FWHM. Such a diffusion performance can be achieved by distributing asymmetric polystyrene beads, of an average diameter in one axis of 5 μm, in a host matrix of polypropylene or acrylic. Desired performance is further realized when this optimized diffusion profile is used in conjunction with a ridged surface structure whereby the ridges have random pitch and depth but have an enclosed angle at the apex of each ridge close to 90 degrees. The required ridged structure can be produced by either embossing directly into the diffusion sheet or by embossing into a UV cured coating applied to the sheet. In order to be used as a laminated sheet, the ridged structure is then coated with a low refractive index material to a sufficient depth of coating that the surface being coated becomes planar. Once this has been achieved, the sheet can be laminated to the input polarizer of the LCD.

Equivalents

Those skilled in the art will recognize, or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other aspects, advantages, and modifications are within the scope of the invention. The contents of all references, issued patents, and published patent applications cited throughout this application are hereby incorporated by reference. The appropriate components, processes, and methods of those patents, applications and other documents may be selected for the invention and embodiments thereof.

What is claimed is:

1. An optical element comprising:
   a) a first light transmitting component of predetermined shape having a first set of refractive indexes at a wavelength of 589 nm of $n_{1x}$, $n_{1y}$, and $n_{1z}$ in x, y, and z directions, respectively; and
   b) a second light transmitting component of predetermined shape having a second set of refractive indexes at a wavelength of 589 nm of $n_{2x}$, $n_{2y}$, and $n_{2z}$ in the x, y, and z directions, respectively, satisfying at least one of the conditions selected from the group consisting of $|(n_{1x}-n_{2x})|>0.01$, $|(n_{1y}-n_{2y})|>0.01$, and $|(n_{1z}-n_{2z})|>0.01$, wherein the second light transmitting component is disposed upon the first light transmitting component; and
   c) a third light transmitting component of predetermined shape having a third set of refractive indexes at a wavelength of 589 nm of $n_{3x}$, $n_{3y}$, and $n_{3z}$ in the x, y, and z directions, respectively, disposed upon the second light transmitting component; and
   d) at least one predetermined light re-directing structure derived from an interface between the first and second light transmitting components such that light of first wavelength and first polarization state incident at a first angle, $\theta_1$, measured from the surface normal, is re-directed to a second angle, $\theta_2$, such that $\theta_1 \neq \theta_2$; and
   e) a light transmissive matrix region having a third set of refractive indexes at a wavelength of 589 nm of $n_{mx}$, $n_{my}$, and $n_{mz}$ in the x, y, and z directions, respectively; and
   f) a plurality of light transmissive micro-bodies substantially encapsulated within the light transmissive matrix region having a fourth set of refractive indexes at a wavelength of 589 nm of $n_{dx}$, $n_{dy}$, and $n_{dz}$ in the x, y, and z directions, respectively, satisfying at least one of the conditions selected from the group consisting of $|(n_{mx}-n_{dx})|>0.01$, $|(n_{my}-n_{dy})|>0.01$, and $|(n_{mz}-n_{dz})|>0.01$.

2. The optical element of claim 1, wherein the first and second light transmitting components satisfy at least one of the conditions selected from the group consisting of $|(n_{1x}-n_{2x})|>0.1$, $|(n_{1y}-n_{2y})|>0.1$, and $|(n_{1z}-n_{2z})|>0.1$.

3. The optical element of claim 2 wherein $n_{2x}$, $n_{2y}$, and $n_{2z}$ are greater than 1.05 and less than 1.5.

4. The optical element of claim 3, wherein the microbodies have a dimension in the x, y, or z direction in the range of about 2 to about 100 μm.

5. The optical element of claim 4, wherein the micro-bodies have a major dimension along a first axis and a minor dimension along a second axis, wherein the major axis dimension is larger than the minor axis dimension.

6. The optical element of claim 4, wherein at least one of the first component, second component or third component contains the matrix region.

7. The optical element of claim 5, further satisfying at least one of the conditions selected from the group consisting of $|(n_{mx}-n_{dx})|<0.01$, $|(n_{my}-n_{dy})|<0.01$, and $|(n_{mz}-n_{dz})|<0.01$.

8. The optical element of claim 4, wherein the optical element comprises an array of structures substantially repeating along a first direction wherein the array is selected from the group consisting of an array of substantially linear prism structures; an array of micro-lens structures; an array of pyramidal structures; a lenticular lens array; and surface topological features.

9. The optical element of claim 8, wherein the optical element has a structure that is random in at least one of the properties selected from the group consisting of size, shape, angle, radius, height, pitch, and orientation.

10. The optical element of claim 8, wherein the micro-bodies have a major dimension along a first axis and a minor dimension along a second axis, wherein the major axis dimension is larger than the minor axis dimension and the first axis is aligned at an average angle, $\phi$, relative to the first direction of the array structures.

11. The optical element of claim 10, wherein $\phi$ satisfies at least one condition selected from the group consisting of $-10<\phi<10$ degrees and $80<\phi<100$ degrees.

12. The optical element of claim 4, further comprising a second light re-directing predetermined structure.

13. The optical element of claim 4, further comprising a second light transmissive matrix region having a fourth set of refractive indexes at a wavelength of 589 nm of $n_{sx}$, $n_{sy}$, and $n_{sz}$ in the x, y, and z directions, respectively, and a second plurality of light transmissive micro-bodies substantially encapsulated within the matrix region having a set of refractive indexes at a wavelength of 589 nm of $n_{tx}$, $n_{ty}$, and $n_{tz}$ in the x, y, and z directions, respectively, satisfying at least one of the conditions selected from the group consisting of $|(n_{mx}-n_{tx})|>0.01$, $|(n_{my}-n_{ty})|>0.01$, and $|(n_{mz}-n_{tz})|>0.01$.

14. The optical element of claim 4, further comprising at least one region selected from the group consisting of a hard-coat, anti-glare anti-blocking, uv absorbtion, anti-static, or anti-reflection.

15. A backlight assembly comprising:
a) a housing;
b) a light source; and
c) the optical element of claim 3.

16. The backlight assembly of claim 15 further comprising at least one optical element selected from the group consisting of a lightguide, diffuser plate, collimating film, prismatic film, diffusion film, reflective polarizer, absorptive polarizer, and a polarization sensitive scattering element.

17. The backlight assembly of claim 16, wherein the light source is selected from the group consisting of one or more light emitting diodes, cold-cathode fluorescent lamps, flat fluorescent lamps, a carbon nanotube light source, and a laser.

18. A display comprising a flat screen display panel and the backlight assembly of claim 15.

19. A method of producing the optical element of claim 3, comprising the steps of
a) forming a blend of the micro-bodies dispersed in a matrix material;
b) extruding the blend into a first assembly comprising the composition of the first light transmitting component;
c) processing the first assembly such that the micro-bodies are elongated;
d) forming the optical element by embossing or casting a pattern on a surface of the first assembly;
e) forming a second assembly by adhering the composition of the second light transmitting component to the first assembly; and
f) adhering the composition of the third light transmitting component to the second assembly.

20. The optical element of claim 10, wherein the second light transmitting component comprises a fluorinated polymer or co-polymer thereof.

21. The optical element of claim 10, wherein the light transmissive matrix is made of a material selected from the group consisting of acrylics, polyolefins, polystyrenes, polycarbonates, polyesters, polyetherimides, polyacrylates, organic acid cellulose esters such as cellulose acetate butyrates, cellulose acetates, and cellulose acetate propionates, silicones, polyamides, polyetherimide, polyethersulfone, polysulfone, fluorinated polymers, or co-polymers thereof.

22. A method of producing the optical element of claim 10, comprising the steps of
a) forming a blend of the micro-bodies dispersed in a matrix material;
b) extruding the blend into a first assembly comprising the composition of the first light transmitting component;
c) forming the optical element by embossing or casting a pattern on a surface of the first assembly;
d) forming a second assembly by adhering the composition of the second light transmitting component to the first assembly; and
e) adhering the composition of the third light transmitting component to the second assembly.

23. The optical element of claim 10, wherein the light transmissive micro-bodies are made of a material selected from the group consisting of inorganic fibrous material, glass fibers, mica, silica, cross-linked polymers, plate-like materials, fibrous polymer materials with high melting points or high glass transition temperatures.

* * * * *